US008855843B2

(12) United States Patent
Kawasaki et al.

(10) Patent No.: US 8,855,843 B2
(45) Date of Patent: Oct. 7, 2014

(54) STARTING CONTROL DEVICE OF ELECTRIC VEHICLE

(75) Inventors: Yuichi Kawasaki, Saitama (JP); Isao Shokaku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 13/109,606

(22) Filed: May 17, 2011

(65) Prior Publication Data

US 2011/0288705 A1 Nov. 24, 2011

(30) Foreign Application Priority Data

May 20, 2010 (JP) ................................. 2010-116379

(51) Int. Cl.
*B60L 9/00* (2006.01)
*B60L 11/18* (2006.01)
*B60L 9/08* (2006.01)
*B60L 9/04* (2006.01)

(52) U.S. Cl.
CPC .......... *B60L 11/1816* (2013.01); *Y02T 10/7233* (2013.01); *B60L 9/00* (2013.01); *Y02T 10/7258* (2013.01); *B60L 2210/40* (2013.01); *Y02T 10/7241* (2013.01); *B60L 2210/30* (2013.01); *B60L 9/08* (2013.01); *B60L 2210/12* (2013.01); *B60L 11/1877* (2013.01); *Y02T 10/7005* (2013.01); *B60L 9/04* (2013.01); *B60L 2200/12* (2013.01); *Y02T 10/7088* (2013.01); *B60L 11/1868* (2013.01); *Y02T 90/121* (2013.01); *B60L 11/1803* (2013.01); *Y02T 90/14* (2013.01); *Y02T 90/127* (2013.01); *Y02T 10/7066* (2013.01)
USPC ............................................. 701/22; 307/9.1

(58) Field of Classification Search
USPC ....................... 701/22; 318/139; 320/103, 104
See application file for complete search history.

(56) References Cited

U.S. PATENT DOCUMENTS

| | | | | |
|---|---|---|---|---|
| 5,309,073 A | * | 5/1994 | Kaneko et al. | 318/500 |
| 5,350,994 A | * | 9/1994 | Kinoshita et al. | 320/116 |
| 5,717,310 A | * | 2/1998 | Sakai et al. | 307/10.1 |
| 5,793,189 A | * | 8/1998 | Kawaguchi et al. | 322/28 |
| 5,994,789 A | * | 11/1999 | Ochiai | 307/10.1 |
| 6,522,960 B2 | * | 2/2003 | Nada | 701/22 |
| 7,230,395 B2 | * | 6/2007 | Horii | 318/139 |
| 8,188,710 B2 | * | 5/2012 | Ichikawa et al. | 320/109 |
| 8,478,469 B2 | * | 7/2013 | Ueo et al. | 701/22 |
| 2009/0001926 A1 | * | 1/2009 | Sato | 320/102 |
| 2010/0270860 A1 | * | 10/2010 | Kamaga | 307/10.7 |
| 2011/0187184 A1 | * | 8/2011 | Ichikawa | 307/10.1 |
| 2012/0123625 A1 | * | 5/2012 | Ueo et al. | 701/22 |

FOREIGN PATENT DOCUMENTS

JP 2002-209301 A 7/2002

* cited by examiner

*Primary Examiner* — Thomas Tarcza
*Assistant Examiner* — Tyler J Lee
(74) *Attorney, Agent, or Firm* — Birch, Stewart, Kolasch & Birch, LLP

(57) ABSTRACT

A socket receives charging voltage and auxiliary voltage of the main battery from an external power supply. A charging line Lch connects the charging voltage to the main battery. Auxiliary power supply lines connect the auxiliary voltage to a vehicle drive control unit. A main switch is provided on a constant line for inputting the output of an electric power converting unit to the vehicle drive control unit. The vehicle drive control unit includes an electric power converting unit starting unit started when the auxiliary voltage is applied to output a starting signal of the electric power converting unit, and means for maintaining the starting signal to charge the sub-battery with the electric power from the electric power converting unit when the voltage applied from the electric power converting unit through the main switch to the vehicle drive control unit is a predetermined value.

20 Claims, 5 Drawing Sheets

STARTING CONTROL DEVICE OF ELECTRIC VEHICLE

CROSS-REFERENCE TO RELATED APPLICATIONS

The present application claims priority under 35 USC 119 to Japanese Patent Application No. 2010-116379 filed on May 20, 2010 the entire contents of which are hereby incorporated by reference.

BACKGROUND OF THE INVENTION

1. Field of the Invention

The present invention relates to a starting control device of an electric vehicle. More particularly, to the starting control device of an electric vehicle including a high voltage main battery for supplying electric power to an electric motor (hereinafter referred to simply as a "motor"), which is a driving source of the vehicle, and a low voltage sub-battery for supplying electric power to electric power driving devices (auxiliaries) except the motor provided in the vehicle.

2. Description of Background Art

Generally an electric vehicle includes a high voltage main battery for supplying electric power to a vehicle traveling motor and a low voltage sub-battery for supplying electric power to on-vehicle devices except the motor. High tension power from the main battery is converted to low tension by an electric power converter (DC-DC converter), and supplied to the sub-battery, thereby charging the sub-battery. On the other hand, in the configuration where a vehicle drive control unit is driven by the electric power from the sub-battery, when the capacity of the sub-battery decreases, even if the capacity of the main battery is enough, the vehicle drive control unit cannot be started, so that the vehicle cannot be operated.

In the electric vehicle described in JP-A-2002-209301, when a vehicle drive control unit (a high rate controller) cannot be started due to a decrease in the capacity of the sub-battery, the so-called jump starting is enabled by applying a starting voltage to the high rate controller from an external power supply device through a cigar lighter socket.

In the electric vehicle described in JP-A-2002-209301, when the residual capacity of the sub-battery is small, a jump starting can be enabled without any supply of electric power from the sub-battery. However, the cigar lighter socket as an external power supply means is used only for the jump starting, not used for charging the main battery. In the hybrid vehicle including an internal combustion engine as a power generation means, a battery charger for charging the main battery by an external power supply device is not needed, but in a pure electric vehicle (Pure-EV), a battery charger for charging the main battery by an external power supply device is needed.

Therefore, if the technique for charging the sub-battery by an external power supply device as described in JP-A-2002-209301 is adopted, both the battery charger of the main battery and the electric power supply device (the cigar lighter socket) for the jump starting are needed. This results in an increase in the number of parts.

SUMMARY AND OBJECT

It is an object of an embodiment of the present invention to address the above problem of the related art and provide a starting control device of an electric vehicle, which may decrease the number of parts while enabling charging of a main battery and charging of a sub-battery for jump starting.

According to embodiment of the present invention, a starting control device of an electric vehicle includes a main battery charged by an external battery charger; a main switch for designating the drive of a vehicle; a motor for generating the driving force of the vehicle by electric power supplied from the main battery; an electric power converting unit for converting the output voltage of the main battery to low voltage; a sub-battery charged with the output electric power of the main battery converted to low voltage by the electric power converting unit only when the main switch of the vehicle is turned on to turn on the power supply; and a vehicle drive control unit started by electric power supplied from the sub-battery to drive the electric power converting unit, wherein in the case where the sub-battery is at a charging level not to drive the electric power converting unit, the vehicle drive control unit operates the electric power converting unit with the electric power supplied from the battery charger to put the vehicle in an operational state when the battery charger is connected in the on state of the main switch, and outputs a signal for charging the main battery to the battery charger when the battery charger is connected in the off state of the main switch.

According to an embodiment of the present invention, the vehicle drive control unit causes the electric power converting means to operate only for a predetermined time when the battery charger is connected and determines the on-off state of the main switch by detecting the output voltage.

According to an embodiment of the present invention, the vehicle drive control unit stops the starting of the electric power converting unit and charges the main battery with external electric power from the charging line when the voltage applied from the electric power converting unit is not a predetermined value.

According to an embodiment of the present invention, the vehicle drive control unit constitutes a PDU (Power Driver Unit) with an inverter circuit for driving the motor, and an electric power line for drawing high voltage from the charging line is connected to the inverter circuit.

According to an embodiment of the present invention, both the main battery and the sub-battery can be charged by the external power supply received from the single receiving unit, so that even when the residual capacity of the sub-battery is small, the jump starting can be performed by connection to the external power supply without any increase in number of parts.

According to an embodiment of the present invention, the electric power converting unit can be operated only for the minimum time required for starting the vehicle by discriminating the voltage applied to the vehicle drive control unit through the main switch.

According to an embodiment of the present invention, the main battery can be charged by the external power supply.

According to an embodiment of the present invention, high voltage required for driving the motor can be supplied to the inverter circuit of the PDU.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
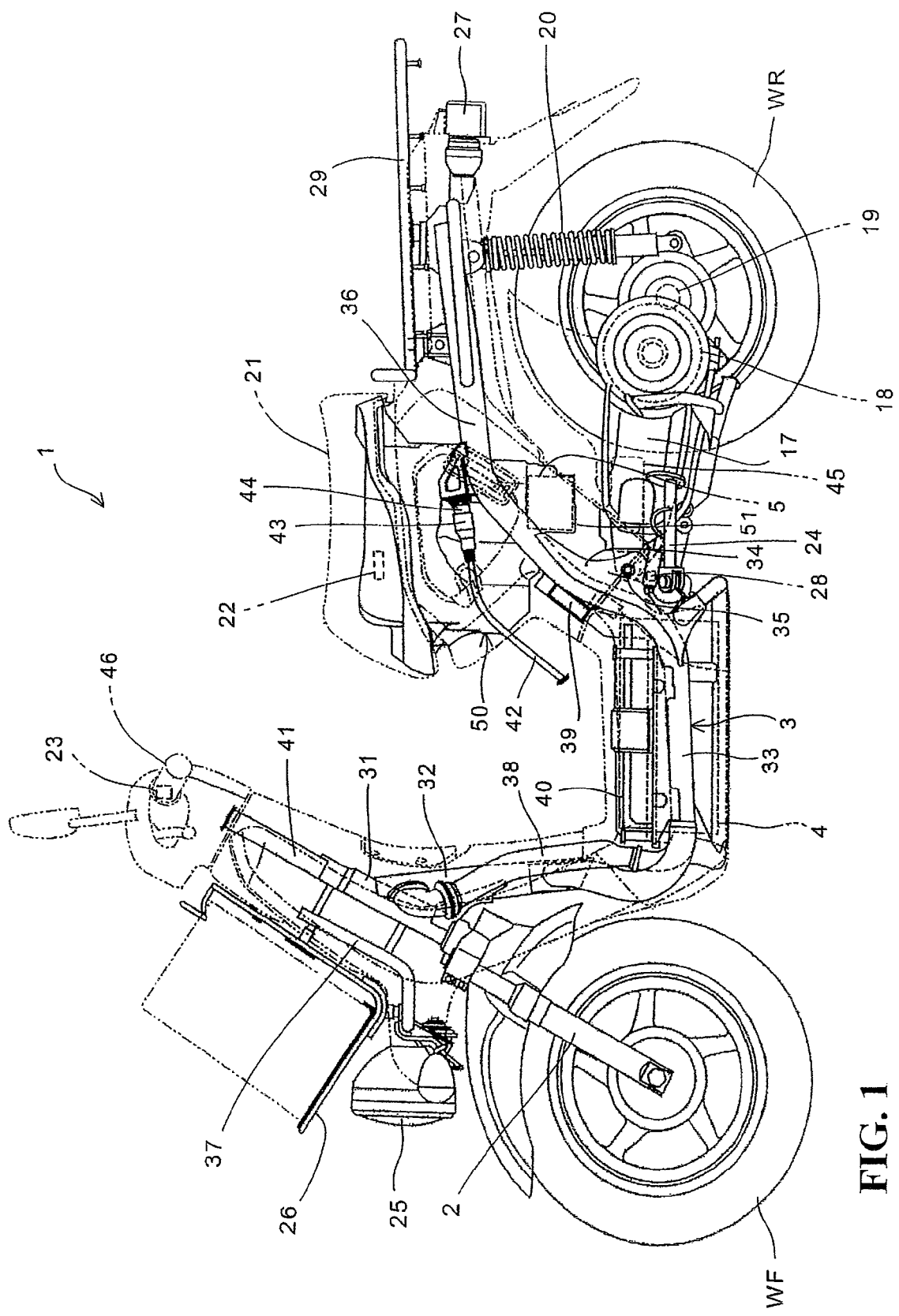
FIG. 1 is a side view of an electric vehicle loaded with a starting control device according to one embodiment of the present invention.

One embodiment of the invention will now be described with reference to the drawings. FIG. 1 is a left side view of an electric vehicle loaded with an electric power supply device according to one embodiment of the invention. The electric vehicle 1 is a scooter type two-wheeled vehicle having a low floor, in which the respective component parts are connected directly or indirectly through other members to a vehicle body frame 3. First the vehicle body frame 3 includes a head pipe 31, which is the front, a front frame part 32, the tip of which is joined to the head pipe 31, the rear end extending downward, a pair of main frame parts 33 respectively branching right and left in the width direction of the body from the front frame part 32 to extend rather closer to the rear of the body, and a rear frame part 36 extending from the main frame part 33 toward the upper rear of the body.

A front fork 2 supporting a front wheel WF is steerably supported on the head pipe 31. A steering handlebar 46 having an accelerator grip is connected to the upper part of a steering shaft 41 extending upwardly from the front fork 2 and supported by the head pipe 31. The steering handlebar 46 is provided with a throttle sensor 23 for detecting a turning angle of the accelerator grip, that is, an accelerator opening.

A bracket 37 formed of a pipe is joined to the front of the head pipe 31, a headlight 25 is fitted to the front end part of the bracket 37. A front carrier 26 supported by the bracket 37 is provided above the headlight 25.

A bracket 34 extending toward the rear of the body is bonded to a middle area between a main frame part 33 and a rear frame part 36 in the vehicle body frame 3, the bracket 34 is provided with a pivot shaft 35 extending in the width direction of the body, and a swing arm 17 is supported vertically rockably by the pivot shaft 35. A motor 18 as the vehicle driving source is provided on the swing arm 17, and the output of the motor 18 is transmitted to a rear wheel axle 19, thereby driving a rear wheel WR supported by the rear wheel axle 19. A housing including the rear wheel axle 19 and the rear frame part 36 are connected to each other by a rear suspension 20.

A side stand 24 supporting the body during stopping is provided on the bracket 34, and the side stand 24 includes a side stand switch 28 for outputting a detection signal when the side stand 24 is stowed in a predetermined position.

A main battery 4 with high voltage (e.g. rated at 72 volts) including a plurality of battery cells is mounted to the main frame part 33, and the upside of the main battery 4 is covered with a cover 40. An air suction pipe 38 is connected to the front of the main battery 4, and the rear of the main battery 4 is provided with an intake fan 39. The air is introduced from the air suction pipe 38 into the main battery 4 by the intake fan 39, and after cooling the main battery 4, the air is discharged to the back of the body.

A socket 44 to which a plug 43 of a charging cable 42 extending from a battery charger (not shown) is provided for charging the main battery 4 above the rear frame part 36. The rear frame part 36 is further provided with a rear carrier 29 and a taillight 27.

A baggage room 50 is provided between a pair of right and left rear frame parts 36, and a sub-battery 5 with low voltage (e.g. rated at 12 volts) charged by the main battery 4 is housed in the bottom 51 of the baggage room projected downward from the baggage room 50. A power drive unit (PDU) 45 for controlling the motor 18 is provided on the swing arm 17.

A rider seat 21 also serving as a lid of the baggage room 50 is mounted on the baggage room 50, and the rider seat 21 is provided with a seat switch 22 operated when the rider is seated to output a seating signal.

Figure 2:
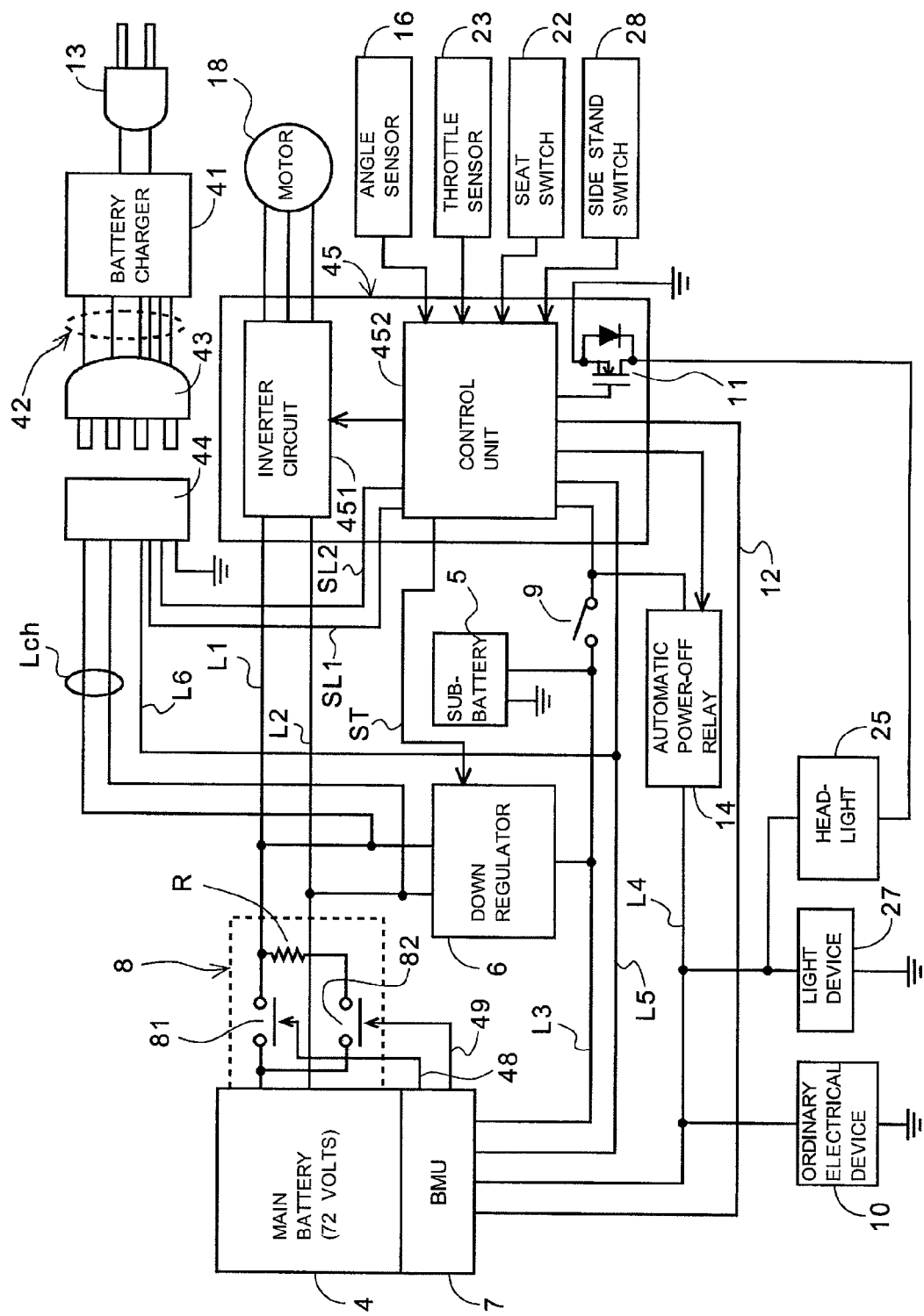
FIG. 2 is a block diagram showing the principal part of an electric power supply device included in the starting control device according to one embodiment of the present invention.

FIG. 2 is a block diagram showing the system configuration of the electric power supply device. An electric power supply device 110 includes the main battery 4, the sub-battery 5, a DC-DC down regulator (hereinafter referred to as "down regulator" simply) 6 as electric power converting means, the PDU 45 and a battery management unit (BMU) 7 provided in the main battery 4. The PDU 45 includes an inverter circuit 451 including a switching element such as a FET or an IGBT, and a control unit (a vehicle drive control unit) 452 for controlling the inverter circuit 451. The control unit 452 includes a CAN communication board.

The main battery 4 includes three sets of battery modules having 24-volt lithium ion, for example, and forms a battery pack with the BMU 7 formed by an LSI. The main battery 4 is electrically connected to the input side of the inverter circuit 451 by electric power lines L1, L2 through a relay device 8 including a main contactor 81 and a pre-charge contactor 82 parallel-connected to each other. A three-phase alternating current output side of the inverter circuit 451 is connected to the motor 18 by a three-phase alternating current line.

The electric power lines L1, L2 connecting the main battery 4 and the inverter circuit 451 to each other are connected midway to the input side of the down regulator 6, and branch to a charging socket 44 as well. More specifically, in charging the main battery 4, the electric power lines L1, L2 constitute part of a charging line Lch connecting the charging socket 44 and the main battery 4 to each other. The down regulator 6 has a function of converting high-voltage input (e.g. voltage of the main battery 4, 72 volts) to low voltage (e.g. charging voltage of the sub-battery 5) and outputting the same. The sub-battery 5 is a control power supply for the control unit 452 and the auxiliaries, which includes a 12-volt battery charged with 14.3 volt, for example.

The output of the down regulator 6 is connected to a normal system line L3, and the normal system line L3 is connected to the BMU 7 and the sub-battery 5. The normal system line L3 is connected to a main switch 9, and the main switch 9 is connected to the control unit 452, the BMU 7, a light device (taillight) 27, the headlight 25 and an ordinary electrical device 10 by a main switch system line L4. The main switch system line L4 is provided with an automatic power-off relay 14.

The headlight 25 is grounded through a switching element (FET) 11 provided in the control unit 452. An angle sensor 16 for detecting the turning angle of the motor 18, the throttle sensor 23, the seat switch 22 and the side stand switch 28 are connected to the control unit 452 of the PDU 45.

A CAN communication line 12 is provided between the BMU 7 and the control unit 452. Signal lines 48, 49 are provided between the BMU 7 and the main contactor 81 and the pre-charge contactor 82 of the relay device 8, respectively, thereby transmitting opening and closing commands for the main contactor 81 and the pre-charge contactor 82, which are output from the BMU 7.

The power supply plug 13 is connected to the output side of a battery charger 41, the input side of which can be connected to a commercial alternating current power supply. The power supply plug 13 is connected to the charging socket 44 to introduce the electric power from the commercial alternating current power supply to the electric power supply device. The battery charger 41 is capable of generating voltage for an auxiliary power supply, and a line L6 for the auxiliary power supply is connected to a control system line L5 connecting the BMU 7 and the control unit 452 to each other.

Figure 3:
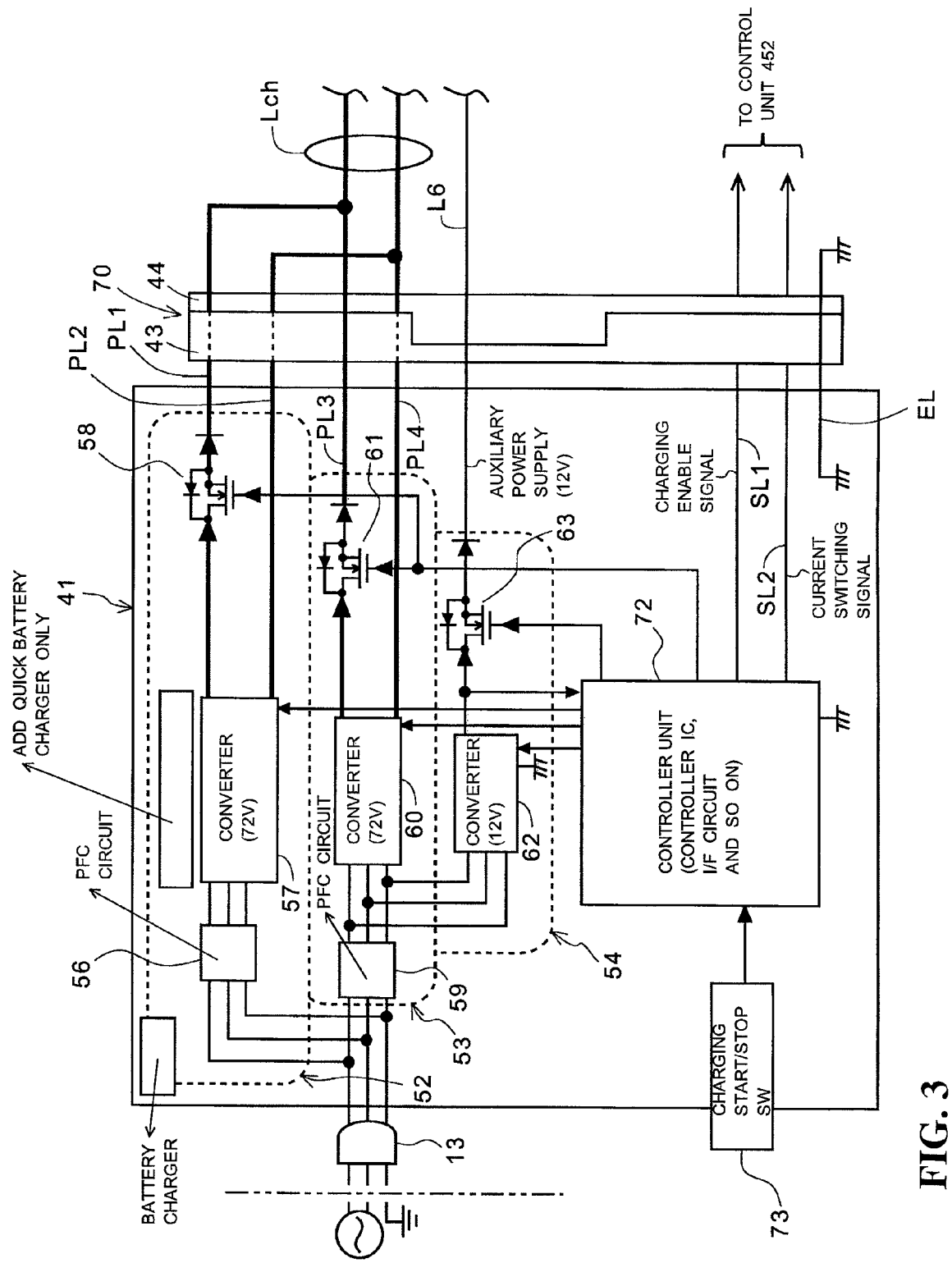
FIG. 3 is a block diagram showing the configuration of a battery charger.

FIG. 3 is a block diagram showing the configuration of the battery charger 41. The battery charger 41 includes two systems of charging electric power generating units 52, 53 connected to the power supply plug 13 and an auxiliary electric power generating unit 54. Further, the battery charger 41 is provided with a charging control unit (a controller unit) 72 for controlling the output of the charging electric power generating units 52, 53 and the auxiliary electric power generating unit 54. The charging control unit 72 includes a controller IC, an interface (I/F) circuit and so on. A charging start/stop switch 73 is connected to the charging control unit 72.

The charging electric power generating unit 52 is added in the case of configuring the battery charger 41 as a quick battery charger, and when it is not the quick battery charger, the charging electric power generating unit 52 is dispensable. The charging electric power generating unit 52 includes a PFC circuit 56 as a power-factor improvement circuit connected to the power supply plug 13, a converter 57 connected to the output side of the PFC circuit 56 and an FET 58 for controlling the output of the converter 57.

The charging electric power generating unit 53 includes a PFC circuit 59, a converter 60 connected to the output side of the PFC circuit 59, and an FET 61 for controlling the output of the converter 60. Similarly, the auxiliary electric power generating unit 54 includes a converter 62 connected to the output side of the PFC circuit 59 and an FET 63 for controlling the output of the converter 62. The converters 57 and 60 generate direct current voltage of 72 volts, for example, and the converter 62 generates low voltage (e.g. direct current 12 volts) usable as a control power supply.

The output side lines PL1 and PL3 of the charging electric power generating units 52, 53 are connected to the charging line Lch of the electric power supply device 110 through a charging coupler 70, and an output side line PL5 of the auxiliary electric power generating unit 54 is connected to a line L6 of an auxiliary power supply through the charging coupler 70. Further, the battery charger 41 and the electric power supply device 110 are connected to each other by signal lines SL1 and SL2 and an earth line EL.

In the configurations described in FIG. 2 and FIG. 3, in the case of operating the vehicle with the main battery 4 having enough residual capacity, first the main switch 9 is turned on. Then, when voltage of the sub-battery 5 is applied to the main switch system line L4, the control unit 452 is driven by the voltage. Further, an automatic power-off relay 14 is turned on, so that the voltage of the sub-battery 5 is applied through the main switch system line L4 to the auxiliaries such as the light device 27, the headlight 25 and the ordinary electrical device 10. Since the headlight 25 is grounded through the FET 11 provided in the control unit 452, a current controlled according to the on time duty ratio of the FET 11 flows through the headlight 25.

When the voltage from the sub-battery 5 is applied through the main switch 9, the control unit 452 inputs a starting signal ST to the down regulator 6. The down regulator 6 starts the operation in response to the starting signal ST.

When the throttle sensor 23 detects the open operation of the throttle, with the main switch 9 put in the on state, supposing that the seat switch 22 and the side stand switch 28 are in the on state, that is, on condition that a rider is seated on the seat 21 and the side stand 24 is raised in a stowed position, the control unit 452 PWM controls the inverter circuit 451 to start the electric power supply from the main battery 4 to the motor 18. The switching timing of the switching element constituting the inverter circuit 451 is determined depending on the turning angle of the motor 18 by the angle sensor 16. In the control unit 452, the vehicle speed can be calculated using the turning angle detected by the angle sensor 16. Accordingly, the angle sensor 16 also functions as a speed detecting sensor of the vehicle driven by the motor 18. The duty ratio control in the PWM control is performed according to a detected opening of the throttle sensor 23.

When the detected opening of the throttle sensor 23 is smaller than a predetermined value or at least one of the seat switch 22 and the side stand switch 25 is turned off, the control unit 452 sets the duty ratio designated to the inverter circuit 451 to zero, thereby stopping the drive of the motor 18.

When the main switch 9 is turned off, after the lapse of a predetermined time, the automatic power-off relay 14 is turned off so that the supply of electric power to the headlight 25, the other light devices 27, the ordinary electrical device 10 and so on is stopped.

Thus, when the residual capacity of the sub-battery 5 is enough, the control unit 452 can be operated by the electric power input from the sub-battery 5. However, when the residual capacity of the sub-battery 5 is not enough, the jump starting is needed.

According to the present embodiment, the electric power is introduced from the external power supply through the battery charger 41 and the charging coupler 70 to thereby easily perform the jump starting.

Figure 4:
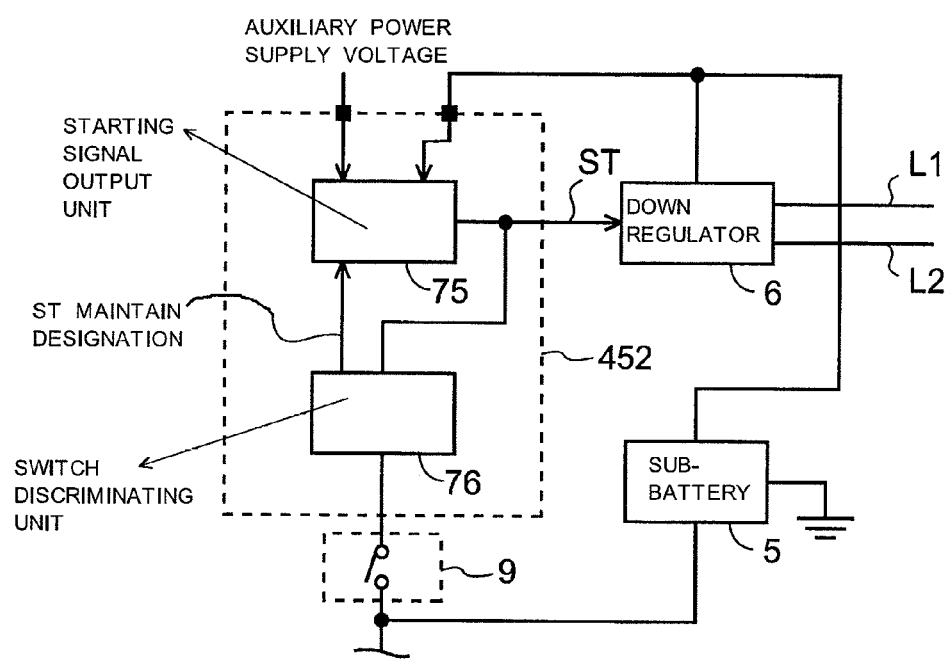
FIG. 4 is a block diagram showing the function of the principal part of a control unit (a vehicle drive control unit)

FIG. 4 is a block diagram showing the function of the principal part of a microcomputer provided in the control unit 452. When an auxiliary power supply voltage is applied from the auxiliary power supply line L6 to the control system line L5, a starting signal output unit 75 outputs a starting signal ST for driving the down regulator 6 to start the down regulator 6. In this case, the starting signal ST is stopped in a preset time. A switch discriminating unit 76 discriminates whether the main switch 9 is on or off depending on whether or not the potential of the normal system line L3 is equal to or more than a predetermined value after the starting signal output unit 75 outputs the starting signal ST. Since the starting signal ST is output, in the case where the main switch 9 is turned on, the voltage is generated from the down regulator 6 to the normal system line L3, and in the case where the main switch 9 is turned off, even if the voltage is applied from the down regulator 6, the voltage above the predetermined value is not generated in the normal system line L3. In this case, the predetermined voltage is set equal to or less than the driving voltage of the control unit 452 by the sub-battery 5, that is, equal to or less than the voltage at which the sub-battery 5 has run out of electricity.

When the main switch 9 is in the on state, the switch discriminating unit 76 outputs designation for maintaining the starting signal ST to the starting signal output unit 75, and on the other hand, when the main switch 9 is in the off state, it stops the starting signal ST in the lapse of the preset time without outputting the designation for maintaining the starting signal ST. When the main switch 9 is in the off state, the starting signal ST may be immediately stopped. While the starting switch ST is maintained, the electric power is supplied to the control unit 452 through the down regulator 6, and the sub-battery 5 can be also charged.

In charging, the charging plug 43 is connected to the charging socket 44, and the power supply plug 13 is connected to an external power supply plug socket (e.g. AC plug socket which is an output part of the commercial electric power system). Then the charging start/stop switch 73 is changed over to the starting side (turned on).

When the residual capacity of the sub-battery 5 is not enough to drive the control unit 452, the main switch 9 is changed over to the on state.

When the charging start/stop switch is turned on, the control electric power is supplied from the converter 62 to the charging control unit 72, and the charging control unit 72 inputs a gate signal to the FET 63 of the auxiliary electric power generating unit 54. Thus, the auxiliary power supply voltage (12 volts) is applied from the battery charger 41 through the auxiliary power supply line L6 to the control system line L5. By the auxiliary power supply voltage (12 volts), the FET 68, the BMU 7 and the PDU 45 of the down regulator 6 are energized.

The PDU 45 communicates with the BMU 7 by CAN communication to recognize the charging state of the main battery 4, and inputs a charging enable signal to the charging control unit 72 through the signal line SL1 when charging is possible. When the charging enable signal is input, the charging control unit 72 inputs a gate signal to the FETs 61, 63 of the charging electric power generating units 52, 53 to generate charging electric power (e.g. voltage of 72 volts). The on-time duty of the FETs 61, 63 is controlled according to the state of the main battery 4 input from the PDU 45 to the charging control unit 72. The relay device 8 turns on a pre-charge contactor 82 and a main contactor 81 in order in response to the charging enable signal. The voltage is applied from the charging electric power generating units 52, 53 to the main battery 4 through the relay device 8 put in the on state, thereby charging the main battery 4.

The PDU 45 starts the down regulator 6 in response to the input of the auxiliary voltage, so that the voltage from the charging electric power generating units 52, 53 stepped down by the converter 67 in the down regulator 6 is connected to the normal system line L3. The sub-battery 5 is charged by the voltage (14.3 volts) connected to the normal system line L3.

Figure 5:
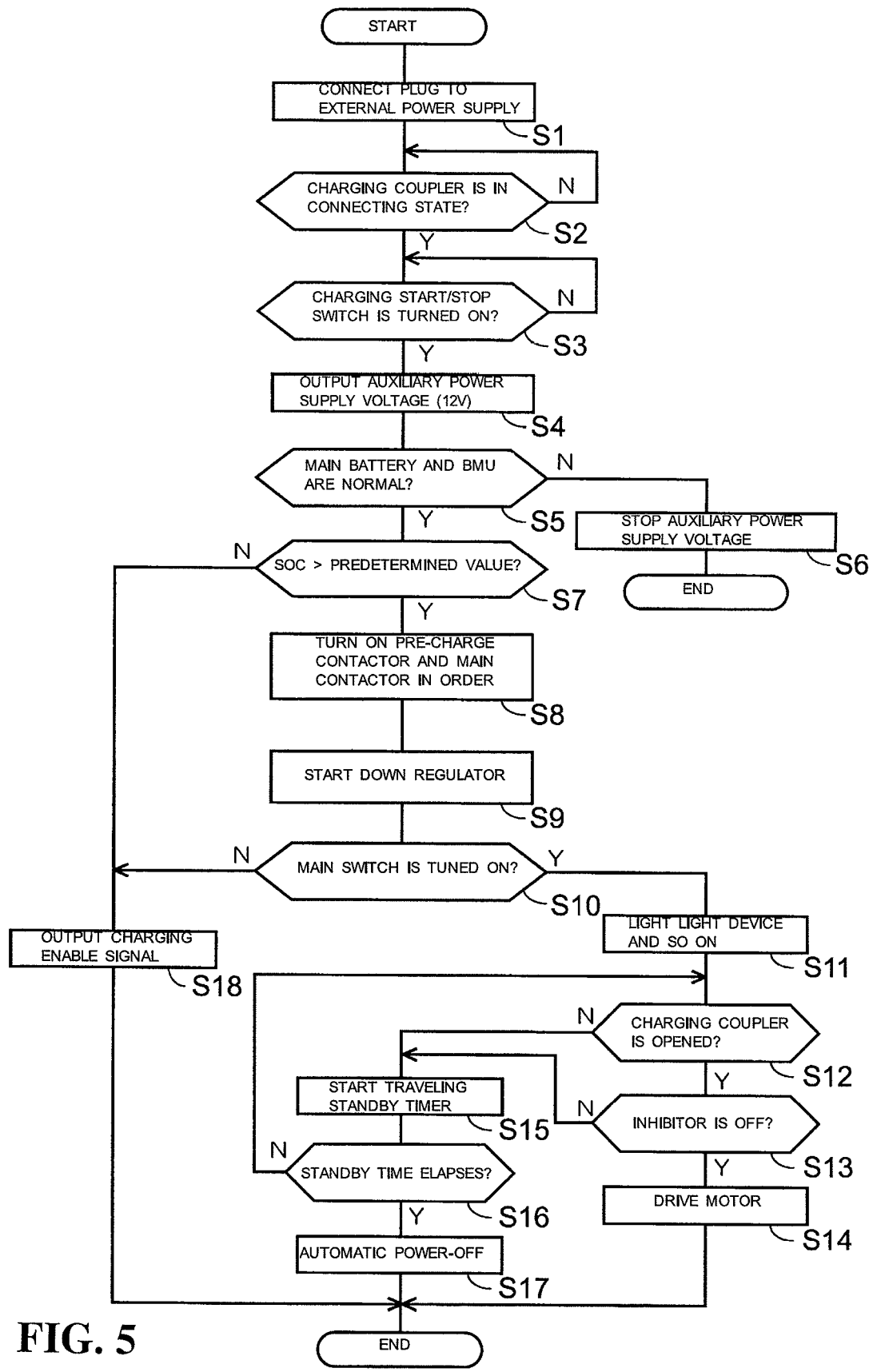
FIG. 5 is a flowchart showing the operation of the starting control device.

FIG. 5 is a flowchart of the operation in which a jump starting mode and a main battery charging mode are put together. In step S1, the power supply plug 13 is connected to the external power supply, that is, the AC plug socket. Thus, the battery charger 41 is started. For the jump starting, at the point in time, that is, subsequently to the connection operation of the power supply plug 13, the main switch 9 is put in the on state. In step S2, it is determined whether or not the charging coupler 70 is connected. In step S3, it is discriminated whether the charging start/stop switch 73 is turned on or not. If yes in step S3, the battery charger 41 outputs the auxiliary power supply voltage (12 volts) to the line L6 (Step S4). Thus, charging to the sub-battery 5 is started, and the voltage of 12 volts is applied to the control unit 452 of the BMU 7 and the PDU 45 through the line L6 to put the vehicle in the operational enabled state.

In step S5, it is determined whether or not the main battery 4 and the BMU 7 are normally operated. This determination is performed through the CAN communication line 12 between the control unit 452 and the BMU 7. When the main battery 4 and the BMU 7 are not normally operated, the advance to step S6 occurs, and the control unit 452 transmits an output stop designation to the battery charger 41. The output stop designation can be performed by turning off a charging enable signal transmitted on the signal line SL1. In response to the output stop designation, the battery charger 41 stops outputting, and the vehicle is stopped. That is, the voltage of 12 volts as the auxiliary power supply voltage applied to the control unit 452 of the BMU 7 and the PDU 45 through the line L6 is stopped.

When the main battery 4 and the BMU 7 are normally operated, in step S5, it is yes and the advance to step S7 occurs. In step S7, it is determined whether or not the residual capacity (SOC) of the main battery 4 is equal to or more than a predetermined value (%) for preventing the over-discharge of the battery. When the charging capacity is a predetermined value or more, it advances to step S8 to turn on the pre-charge contactor 82 and the main contactor 81. The pre-charge contactor 82 and the main contactor 81 turn on in response to a command from the BMU 7. In step S9, the down regulator 6 is started according to the starting signal ST from the control unit 452. In this case, the down regulator 6 is driven while the starting signal ST is maintained during a predetermined time.

In step S10, it is determined whether or not the main switch 9 is in the on state. When the main switch 9 is in the on state, the transition to the operational mode (the jump starting mode) occurs. First, in step S11, the light device 27 and the headlight 25 are illuminated. Subsequently, in step S12, it is determined whether or not the charging coupler 70 is opened. When the charging coupler 70 is opened, it advances to step S13 to determine whether or not the conditions (inhibitor) for inhibiting operation are all turned off. When the inhibitor is in the off state, in step S14, a driving signal (a PWM signal) is input from the control unit 452 to the inverter circuit 451 to drive the motor 18. Thus, the vehicle is operated.

When the charging coupler 70 is not opened or the inhibitor is not in the off state, it advances from steps S12, S13 to step S15 to start an operational standby timer. In step S16, it is determined whether or not the operational standby timer measures a predetermined standby time (e.g. five minutes) or more. Before the predetermined standby time or more elapses, it is NOT in step S16, and it advances to step S12. When the charging coupler 70 is not opened and also the inhibitor is not turned off even if the operational standby timer measures a predetermined time or more, it is YES in step S16 and it advances to step S17. The automatic power-off relay 14 is turned on to interrupt the main switch system line L4 and suspend the operation (automatic power-off).

When the main switch 9 is in the off state, it is NOT in step S10, and the transition to the charging mode of the main battery 4 occurs. That is, in step S18, the control unit 452 outputs a charging enable signal. When the charging enable signal is output, the battery charger 41 outputs high voltage to charge the main battery 4.

When it is NOT in step S7, immediately it advances to step S18 to start charging, thereby preventing over discharge of the main battery.

According to the present embodiment, as described above, even in the case where the sub-battery 5 does not have enough residual capacity, when the main switch 9 is turned on similarly to the ordinary operational start, with the external power supply put in the connecting state, the down regulator 6 is operated to supply the electric power to the control unit 452, so that the jump starting can be performed and the sub-battery 5 is charged. In the case of charging the main battery 4 only without charging the sub-battery 5, it is sufficient to operate the battery charger 41 with the main switch 9 put in the off state.

In the process of charging the main battery 4, the voltage of the sub-battery 5 is detected. When the voltage is a predetermined value or less, the down regulator 6 may be started to charge the sub-battery. The voltage of the sub-battery 5 is detected, and when the voltage is a predetermined value or less, the sub-battery 5 may be charged by voltage of 12 volts of the auxiliary power supply output from the battery charger 41.

The present invention is not limited to the above embodiment, it may be preformed within the range of items described in the claims and the well-known art and applied to electric motor vehicles.

What is claimed is:

1. A starting control device for an electric vehicle, comprising:
   a main battery charged by an external battery charger;
   a main switch for designating an operational state of a vehicle;
   a motor for generating a driving force of the vehicle by electric power supplied from the main battery;
   an electric power converting unit for converting an output voltage of the main battery to a low voltage;
   a sub-battery charged with output electric power of the main battery converted to low voltage by the electric power converting unit only when the main switch of the vehicle is turned on to put the power supply in an on-state;
   a vehicle drive control unit started by electric power supplied from the sub-battery to drive the electric power converting unit; and
   a normal system line (L3) having two portions, the main switch being located between and connecting the two portions,
   wherein the portion of the normal system line (L3) extending from one side of the main switch is directly connected to the vehicle drive control unit in a fixed manner, and
   the portion of the normal system line (L3) extending from an opposite side of the main switch is directly connected to each of the sub-battery, an output side of the electric power converting unit, and the main battery in a fixed manner,
   so that when the main switch is on an off-state, the normal system line (L3) between the vehicle drive control unit and the main battery is open, and
   wherein in the case where the sub-battery is at a charging level not to drive the electric power converting unit, the vehicle drive control unit causes the electric power converting unit to operate by the electric power supplied from the battery charger to thereby put the vehicle in an operating state when the battery charger is put in a connecting state with the main switch in the on-state, and outputs a signal for charging the main battery to the battery charger when the battery charger is put in the connecting state with the main switch in the off-state.

2. The starting control device for an electric vehicle according to claim 1, wherein the vehicle drive control unit activates the electric power converting unit only during a predetermined time when the battery charger is put in the connecting state, and determines the on-state or the off-state of the main switch by detecting the output voltage.

3. The starting control device for an electric vehicle according to claim 1, wherein the vehicle drive control unit stops starting of the electric power converting unit to charge the main battery with external electric power from a charging line when the voltage applied from the electric power converting unit is not a predetermined value.

4. The starting control device for an electric vehicle according to claim 2, wherein the vehicle drive control unit stops starting of the electric power converting unit to charge the main battery with external electric power from a charging line when the voltage applied from the electric power converting unit is not a predetermined value.

5. The starting control device for an electric vehicle according to claim 1, wherein the vehicle drive control unit constitutes a Power Drive Unit (PDU) with an inverter circuit for driving the motor; and
   lines for drawing high voltage from the charging line are connected to the inverter circuit.

6. The starting control device for an electric vehicle according to claim 2, wherein the vehicle drive control unit constitutes a Power Drive Unit (PDU) with an inverter circuit for driving the motor; and
   lines for drawing high voltage from the charging line are connected to the inverter circuit.

7. The starting control device for an electric vehicle according to claim 3, wherein the vehicle drive control unit constitutes a Power Drive Unit (PDU) with an inverter circuit for driving the motor; and
   lines for drawing high voltage from the charging line are connected to the inverter circuit.

8. The starting control device for an electric vehicle according to claim 1, wherein when the main switch is in the off-state, a transition to a charging mode of the main battery occurs.

9. The starting control device for an electric vehicle according to claim 1, wherein when the main switch is in the on-state during ordinary operation with an external power supply being placed in a connecting state, the electric power converting unit is operated to supply power to the vehicle drive control unit, wherein a jump starting can be performed and the sub-battery is charged.

10. The starting control device for an electric vehicle according to claim 9, wherein when the main battery is charged without charging the sub-battery, the battery charger is operated with the main switch in the off-state.

11. A starting control device for use with an electric vehicle, comprising:
   a main battery adapted to be charged by an external battery charger;
   a main switch operatively connected for designating an operational state of a vehicle;
   a motor for generating a driving force by electric power supplied from the main battery;
   an electric power converting unit adapted for converting an output voltage of the main battery to low voltage;
   a sub-battery adapted to be charged with output electric power of the main battery converted to low voltage by the electric power converting unit only when the main switch of the vehicle is turned for placing the power supply in an on-state; and
   a vehicle drive control unit adapted to be started by electric power supplied from the sub-battery to drive the electric power converting unit; and
   a normal system line (L3) having two portions, the main switch being located between and connecting the two portions,
   wherein the portion of the normal system line (L3) extending from one side of the main switch is directly connected to the vehicle drive control unit in a fixed manner, and
   the portion of the normal system line (L3) extending from an opposite side of the main switch is directly connected to each of the sub-battery, an output side of the electric power converting unit, and the main battery in a fixed manner, so that when the main switch is on an off-state, the normal system line (L3) between the vehicle drive control unit and the main battery is open, and wherein in the case where the sub-battery is at a charging level not to drive the electric power converting unit, the vehicle drive control unit causes the electric power converting unit to operate by the electric power supplied from the battery charger to thereby put the vehicle in an operating state when the battery charger is put in a connecting state with the main switch in the on-state, and outputs a signal for charging the main battery to the battery charger when the battery charger is put in the connecting state with the main switch in the off-state.

12. The starting control device for use with an electric vehicle according to claim 11, wherein the vehicle drive control unit activates the electric power converting unit only during a predetermined time when the battery charger is put in the connecting state, and determines the on-state or the off-state of the main switch by detecting the output voltage.

13. The starting control device for use with an electric vehicle according to claim 11, wherein the vehicle drive control unit stops starting of the electric power converting unit to charge the main battery with external electric power from a charging line when the voltage applied from the electric power converting unit is not a predetermined value.

14. The starting control device for use with an electric vehicle according to claim 12, wherein the vehicle drive control unit stops starting of the electric power converting unit to charge the main battery with external electric power from a charging line when the voltage applied from the electric power converting unit is not a predetermined value.

15. The starting control device for use with an electric vehicle according to claim 11, wherein the vehicle drive control unit constitutes a Power Drive Unit (PDU) with an inverter circuit for driving the motor; and lines for drawing high voltage from the charging line are connected to the inverter circuit.

16. The starting control device for use with an electric vehicle according to claim 12, wherein the vehicle drive control unit constitutes a Power Drive Unit (PDU) with an inverter circuit for driving the motor; and lines for drawing high voltage from the charging line are connected to the inverter circuit.

17. The starting control device for use with an electric vehicle according to claim 13, wherein the vehicle drive control unit constitutes a Power Drive Unit (PDU) with an inverter circuit for driving the motor; and lines for drawing high voltage from the charging line are connected to the inverter circuit.

18. The starting control device for use with an electric vehicle according to claim 11, wherein when the main switch is in the off-state, a transition to a charging mode of the main battery occurs.

19. The starting control device for use with an electric vehicle according to claim 11, wherein when the main switch is in the on-state during ordinary operation with an external power supply being placed in a connecting state, the electric power converting unit is operated to supply power to the vehicle drive control unit, wherein a jump starting can be performed and the sub-battery is charged.

20. The starting control device for use with an electric vehicle according to claim 19, wherein when the main battery is charged without charging the sub-battery, the battery charger is operated with the main switch in the off-state.

* * * * *